United States Patent
Cho et al.

(10) Patent No.: US 10,473,388 B2
(45) Date of Patent: Nov. 12, 2019

(54) REFRIGERATOR AND METHOD FOR CONTROLLING CONSTANT TEMPERATURE THEREOF

(71) Applicant: LG ELECTRONICS INC., Seoul (KR)

(72) Inventors: Yong Hyeon Cho, Seoul (KR); Sunghee Kang, Seoul (KR); Kihwang Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 15/635,880

(22) Filed: Jun. 28, 2017

(65) Prior Publication Data

US 2017/0370635 A1 Dec. 28, 2017

(30) Foreign Application Priority Data

Jun. 28, 2016 (KR) ........................ 10-2016-0081088

(51) Int. Cl.
*F25D 29/00* (2006.01)
*F25D 11/02* (2006.01)
(Continued)

(52) U.S. Cl.
CPC ............ *F25D 29/00* (2013.01); *F25D 11/022* (2013.01); *F25D 17/065* (2013.01); *F25B 5/02* (2013.01); *F25B 2500/31* (2013.01); *F25B 2600/112* (2013.01); *F25B 2600/2511* (2013.01); *F25D 2600/04* (2013.01); *F25D 2700/12* (2013.01);
(Continued)

(58) Field of Classification Search
CPC ............ F25B 2500/31; F25B 2600/112; F25B 2600/2511; F25B 5/02; F25D 11/02; F25D 11/022; F25D 17/065; F25D 2600/04; F25D 2700/12; F25D 2700/122; F25D 2700/14; F25D 29/00; Y02B 30/743; Y02B 40/32

See application file for complete search history.

(56) References Cited

U.S. PATENT DOCUMENTS 5,931,011 A * 8/1999 Shima ................. F25D 17/062
165/269
9,163,872 B2 * 10/2015 Fragnito ............... F25D 29/003
(Continued)

FOREIGN PATENT DOCUMENTS

EP 2136166 12/2009
JP 05223429 8/1993
(Continued)

OTHER PUBLICATIONS

Extended European Search Report in European Application No. 17178164.4, dated Dec. 22, 2017, 9 pages.

*Primary Examiner* — Edward F Landrum
*Assistant Examiner* — Chang H. Park
(74) *Attorney, Agent, or Firm* — Fish & Richardson P.C.

(57) ABSTRACT

A method, which is for controlling a temperature of a refrigerating compartment, includes cooling the refrigerating compartment, cooling the freezing compartment, determining a temperature of the refrigerating compartment, and based on the temperature of the refrigerating compartment, controlling the refrigerating compartment to a constant temperature range by controlling opening and closing of first and second passages of a three-way valve of the refrigerator to alternate cooling the refrigerating compartment and cooling the freezing compartment.

20 Claims, 7 Drawing Sheets

(51) Int. Cl.
  *F25D 17/06* (2006.01)
  *F25B 5/02* (2006.01)
(52) U.S. Cl.
  CPC .... *F25D 2700/122* (2013.01); *F25D 2700/14* (2013.01); *Y02B 30/743* (2013.01); *Y02B 40/32* (2013.01)

(56) References Cited

U.S. PATENT DOCUMENTS

| | | | | |
|---|---|---|---|---|
| 2006/0144063 | A1* | 7/2006 | Oh | F25B 49/022 62/200 |
| 2007/0068180 | A1 | 3/2007 | Yoon et al. | |
| 2010/0146997 | A1* | 6/2010 | Eom | F25D 17/065 62/157 |

FOREIGN PATENT DOCUMENTS

| | | |
|---|---|---|
| JP | 06094978 | 11/1994 |
| JP | 2004116841 A | 4/2004 |
| KR | 10-2001-0030430 | 4/2001 |
| KR | 100806314 | 2/2008 |
| KR | 20110067591 | 6/2011 |

* cited by examiner

REFRIGERATOR AND METHOD FOR CONTROLLING CONSTANT TEMPERATURE THEREOF

CROSS-REFERENCE TO RELATED APPLICATION

This application claims priority to and the benefit of Korean Patent Application No. 10-2016-0081088, filed on Jun. 28, 2016, the disclosure of which is incorporated herein by reference in its entirety.

FIELD

The present disclosure relates to a refrigerator and a method for controlling a constant temperature of a refrigerating compartment of the refrigerator, and more particularly, to a refrigerator that can store goods or the like and a method for controlling a constant temperature of a refrigerating compartment of the refrigerator.

BACKGROUND

A refrigerator may discharge cold air generated by a refrigeration cycle that may include a compressor, a condenser, an expansion valve, an evaporator, and the like to lower a temperature inside the refrigerator for freezing or refrigerating food or the like stored in the refrigerator.

An example cooling system of a refrigerator may include a compressor, a condenser, an expansion device, and an evaporator.

According to this example cooling system, a cooling cycle may be accomplished in such a manner that a refrigerant compressed into a high-temperature and high-pressure gaseous state by the compressor is sent to the expansion device after being condensed by the condenser. Next, the refrigerant is expanded by the expansion device and changed into a low-temperature and low-pressure gaseous state and is sent to the compressor again after being heat-exchanged with outside air by the evaporator.

Recently, a cooling system with two evaporators installed in a refrigerator has been used.

This cooling system may include a compressor, a condenser, a three-way valve, two expansion devices, and two evaporators.

The three-way valve may have a structure in which a refrigerant pipe is installed in two branches thereof and the expansion device and the evaporator are respectively installed in two bifurcations branched from a branch pipe.

In such a cooling system, the cooling cycle may be performed such that refrigerant passing through the compressor and the condenser is introduced into the evaporator and one or the other side of the expansion device by switching the three-way valve, and then the refrigerant is repeatedly introduced into the compressor after being heat-exchanged with air in each evaporator into which the refrigerant is introduced.

According to this, when the three-way valve is switched so that the refrigerant passing through the compressor and the condenser is introduced into an evaporator provided for cooling a refrigerating compartment, the refrigerating compartment is cooled, and when the three-way valve is switched so that the refrigerant passing through the compressor and the condenser is introduced into an evaporator provided for cooling a freezing compartment, the freezing compartment is cooled.

That is, cooling for the refrigerating compartment and cooling for the freezing compartment are alternately performed in accordance with the switching of the three-way valve.

Since a refrigerator having the above-described cooling system cannot simultaneously perform the cooling for the refrigerating compartment and the cooling for the freezing compartment due to characteristics thereof, a cooling operation is typically performed by repeating a pattern in which the cooling for the refrigerating compartment is performed to lower a temperature of the refrigerating compartment to a predetermined temperature, the cooling for the freezing compartment is performed to lower a temperature of the freezing compartment to a predetermined temperature, and then the cooling for the refrigerating compartment is performed again.

During such a cooling process, the cooling for the refrigerating compartment may be stopped while the freezing compartment is being cooled such that the temperature of the refrigerating compartment is increased.

For example, a pattern may be performed in which cooling is performed so that the temperature of the refrigerating compartment becomes somewhat lower than a set temperature while the refrigerating compartment is being cooled, the temperature of the refrigerating compartment rises above the set temperature while the freezing compartment is being cooled, and then the cooling is performed so that the temperature of the refrigerating compartment becomes lower than the set temperature again while the refrigerating compartment is being cooled.

In the example cooling operation of the refrigerator as described above, a large temperature deviation may occur between a start of the cooling for the refrigerating compartment and an end of the cooling for the refrigerating compartment, which may result in a large deviation between the set temperature of the refrigerating compartment and an actual temperature thereof. In some examples, it may be difficult to effectively maintain freshness of stored goods stored in the refrigerating compartment.

SUMMARY

The present disclosure describes a refrigerator which can effectively improve freshness maintenance performance of the refrigerator, and a method for controlling a constant temperature of a refrigerating compartment of the refrigerator.

The present disclosure also describes a refrigerator which can reduce power consumption while effectively maintaining a temperature state of a refrigerating compartment, and a method for controlling a constant temperature of a refrigerating compartment of the refrigerator.

According to one aspect of the subject matter described in this application, a method, which is for controlling a temperature of a refrigerating compartment of a refrigerator including a compressor configured to supply a compressed refrigerant, a refrigerating compartment evaporator configured to receive the refrigerant from the compressor and to generate first cold air for cooling the refrigerating compartment, a freezing compartment evaporator configured to receive the refrigerant from the compressor and to generate second cold air for cooling a freezing compartment, and a three-way valve configured to selectively open and close one of a first passage connecting the compressor and the refrigerating compartment evaporator and a second passage connecting the compressor and the freezing compartment evaporator, may include cooling the refrigerating compartment, cooling the freezing compartment, determining a temperature of the refrigerating compartment, and based on the temperature of the refrigerating compartment, controlling the refrigerating compartment to a constant temperature range by controlling opening and closing of the first and second passages of the three-way valve to alternate cooling the refrigerating compartment and cooling the freezing compartment.

Implementations according to this aspect may include one or more of following features. For example, the method may further include comparing the temperature of the refrigerating compartment to a set minimum temperature, determining whether the temperature of the refrigerating compartment is less than or equal to the set minimum temperature, based on determination that the temperature of the refrigerating compartment is less than or equal to the set minimum temperature, cooling the freezing compartment, based on cooling the freezing compartment, determining whether a temperature of the freezing compartment is greater than a preset freezing temperature, based on determination that the temperature of the freezing compartment is greater than the preset freezing temperature, comparing the temperature of the refrigerating compartment to a set maximum temperature, determining whether the temperature of the refrigerating compartment is greater than or equal to the set maximum temperature, and based on determination that the temperature of the refrigerating compartment is greater than or equal to the set maximum temperature, cooling the refrigerating compartment.

In some implementations, at least one alternation of cooling the refrigerating compartment and cooling the freezing compartment may define a cooling cycle between an initial time point and a last time point. Cooling the refrigerating compartment may include cooling the refrigerating compartment at the last time point of the cooling cycle. In some examples, cooling the refrigerating compartment may include cooling the refrigerating compartment at the initial time point of the cooling cycle.

In some Implementations, cooling the refrigerating compartment may include activating the compressor, operating a refrigerating fan configured to supply the first cold air to the refrigerating compartment, and opening the first passage of the three-way valve. In some examples, cooling the refrigerating compartment may include deactivating the compressor, operating a refrigerating fan configured to supply the first cold air to the refrigerating compartment, and opening the first passage of the three-way valve. The method may further include performing at least one of a first refrigerating operation or a second refrigerating operation. Performing the first refrigerating operation may include activating the compressor, operating a refrigerating fan configured to supply the first cold air to the refrigerating compartment, and opening the first passage of the three-way valve. Performing the second refrigerating operation may include deactivating the compressor, operating the refrigerating fan, and opening the first passage of the three-way valve.

In implementations, cooling the freezing compartment may include activating the compressor, operating a freezing fan configured to supply the second cold air to the freezing compartment, and opening the second passage of the three-way valve. Cooling the freezing compartment may further include operating the freezing fan without operating the refrigerating fan. In some examples, cooling the refrigerating compartment may further include operating the refrigerating fan without operating the freezing fan.

In some implementations, performing the second refrigerating operation may include performing the second refrigerating operation at the last time point of the cooling cycle. The method may further include determining an outside temperature around the refrigerating compartment, comparing the outside temperature to a preset reference temperature, determining whether the outside temperature is less than or equal to the preset reference temperature, and based on determination that the outside temperature is less than or equal to the preset reference temperature, performing the second refrigerating operation.

In some implementations, the method may further include, based on determination that the outside temperature is greater than the preset reference temperature, performing the first refrigerating operation. Determining the outside temperature may include determining the outside temperature based on information about a temperature rising speed of the refrigerating compartment. The method may further include determining a temperature of the freezing compartment, comparing the temperature of the freezing compartment to a preset freezing temperature, determining whether the temperature of the freezing compartment is less than the preset freezing temperature, based on determination that the temperature of the freezing compartment is less than the preset freezing temperature, terminating cooling the freezing compartment, and based on termination of cooling the freezing compartment, terminating cooling the refrigerating compartment.

In some implementations, the method may further include, based on termination of cooling the freezing compartment, comparing an outside temperature around the refrigerating compartment to a preset reference temperature, determining whether the outside temperature is greater than a preset reference temperature, and based on determination that the outside temperature is greater than the preset reference temperature, performing a first refrigerating operation, wherein performing the first refrigerating operation includes activating the compressor, operating a refrigerating fan configured to supply the first cold air to the refrigerating compartment, and opening the first passage of the three-way valve. The method may further include determining whether the outside temperature is less than or equal to the preset reference temperature, and based on determination that the outside temperature is less than or equal to the preset reference temperature, performing a second refrigerating operation, wherein performing the second refrigerating operation includes deactivating the compressor, operating the refrigerating fan, and opening the first passage of the three-way valve. In some implementations, the set maximum temperature and the set minimum temperature may bound a predetermined set temperature range.

According to another aspect, a refrigerator includes a main body defining a refrigerating compartment and a freezing compartment, a compressor provided at the main body and configured to compress refrigerant and supply the compressed refrigerant, a refrigerating compartment evaporator configured to receive the compressed refrigerant and to generate first cold air for cooling the refrigerating compartment, a freezing compartment evaporator configured to receive the compressed refrigerant and to generate second cold air for cooling the freezing compartment, a three-way valve configured to selectively open and close one of a first passage connecting the compressor and the refrigerating compartment evaporator and a second passage connecting the compressor and the freezing compartment evaporator, a refrigerating fan configured to supply the first cold air to the refrigerating compartment, a refrigerating compartment temperature measuring unit configured to measure a temperature of the refrigerating compartment, and a controller configured to control the compressor, the three-way vale, and the refrigerating fan to alternate cooling of the refrigerating compartment and cooling of the freezing compartment. The controller is configured to control the refrigerating compartment to a constant temperature range by controlling opening and closing of the first and second passages of the three-way valve to alternate cooling of the refrigerating compartment and cooling of the freezing compartment based on the temperature measured by the refrigerating compartment temperature measuring unit.

DETAILED DESCRIPTION

A refrigerator and a method for controlling a constant temperature of a refrigerating compartment of a refrigerator according to an implementation of the present disclosure will be described with reference to the accompanying drawings. Thicknesses of lines or sizes of components illustrated in the drawings may be exaggerated for clarity and convenience of the description. Terms used herein are defined for functions in the present disclosure and may vary according to users, intentions of operators, or practice. Thus, the terms should be defined on the basis of the entire content of the present disclosure.

Figure 1:
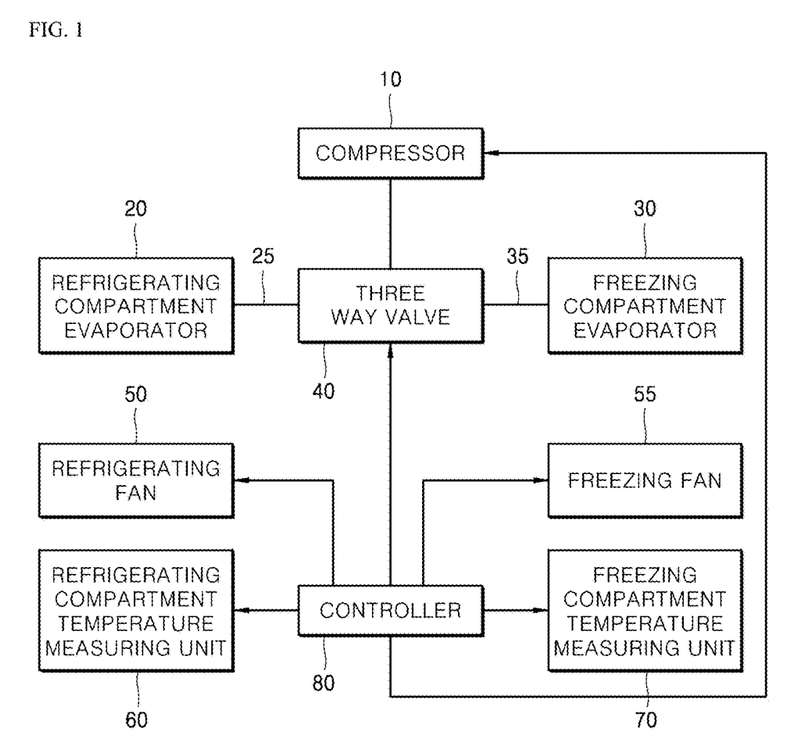
FIG. 1 is a schematic block diagram showing an example refrigerator.
Figure 2:
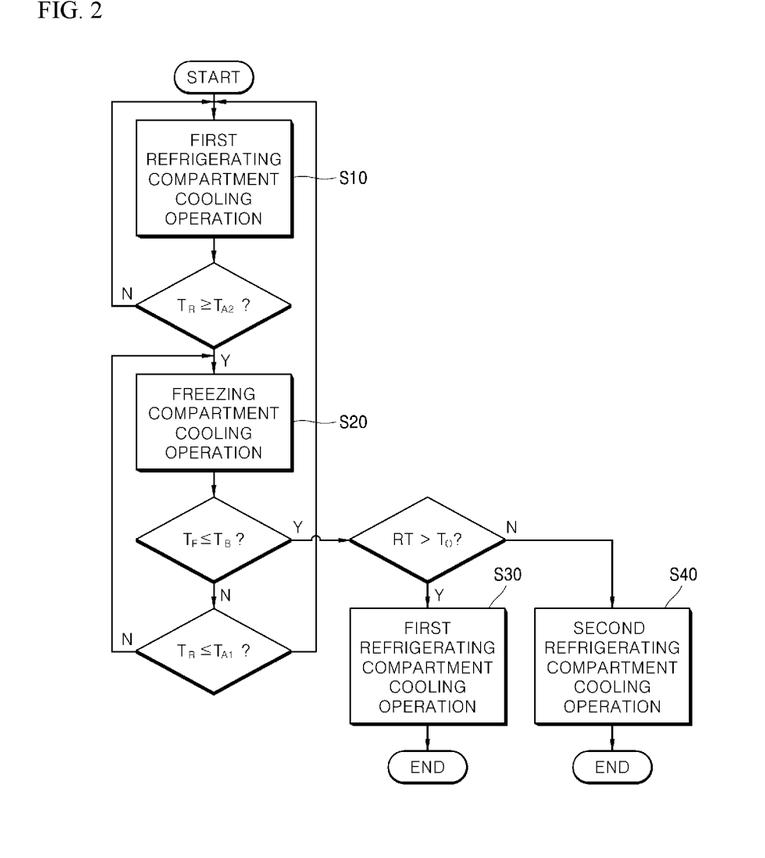
FIG. 2 is a flowchart showing an example method for controlling a constant temperature of a refrigerating compartment of a refrigerator.
Figure 3:
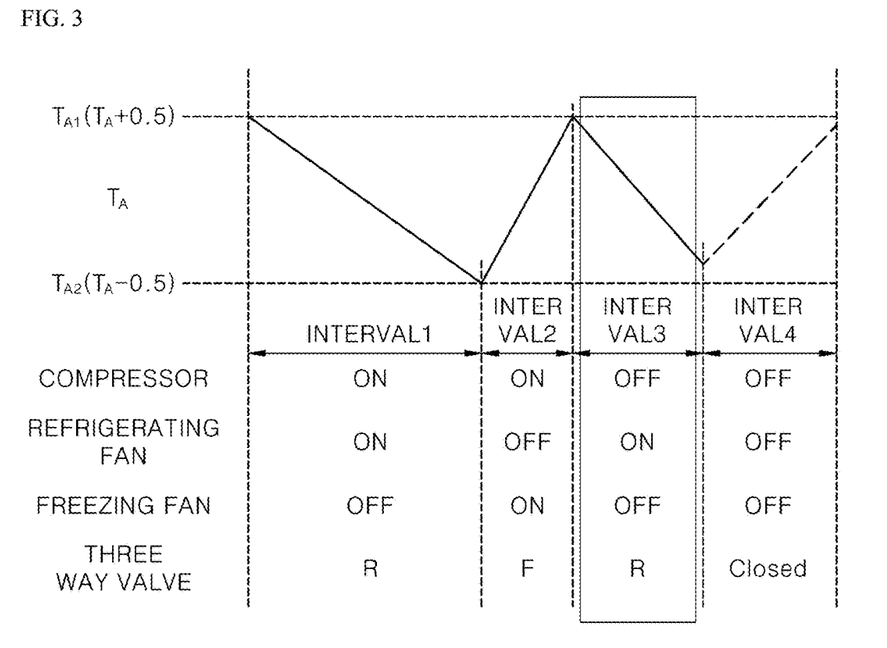
FIG. 3 is a view showing an example of a constant temperature control process according to an example method for controlling a constant temperature of a refrigerating compartment.
Figure 4:
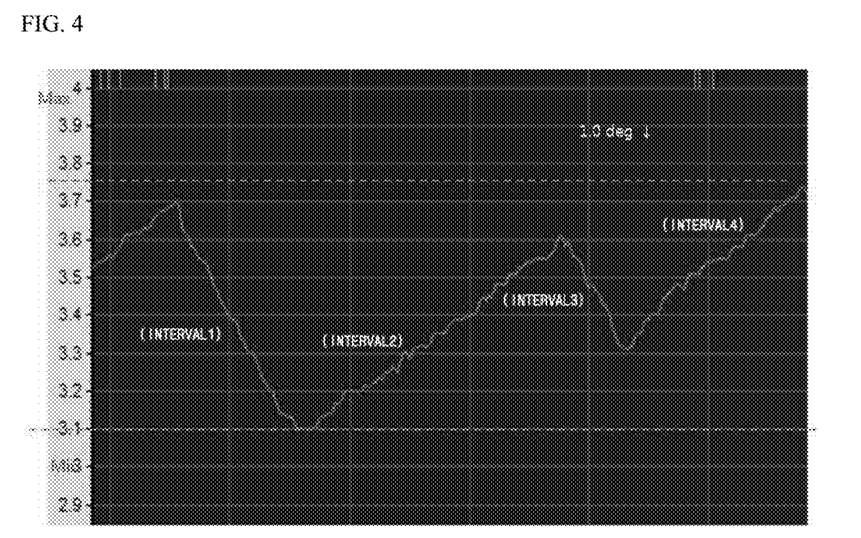
FIG. 4 is a graph showing an example temperature change in the refrigerating compartment by the process shown in FIG. 3.
Figure 5:
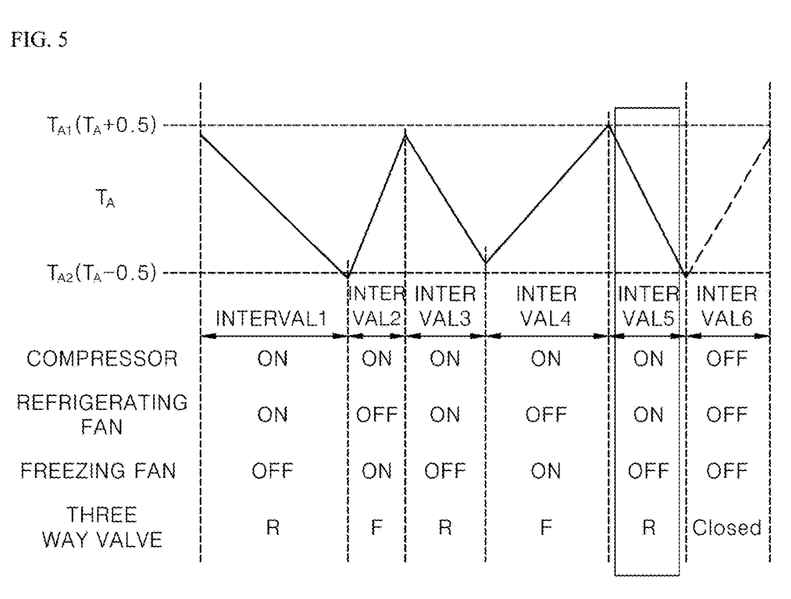
FIG. 5 is a view showing another example of a constant temperature control process.
Figure 6:
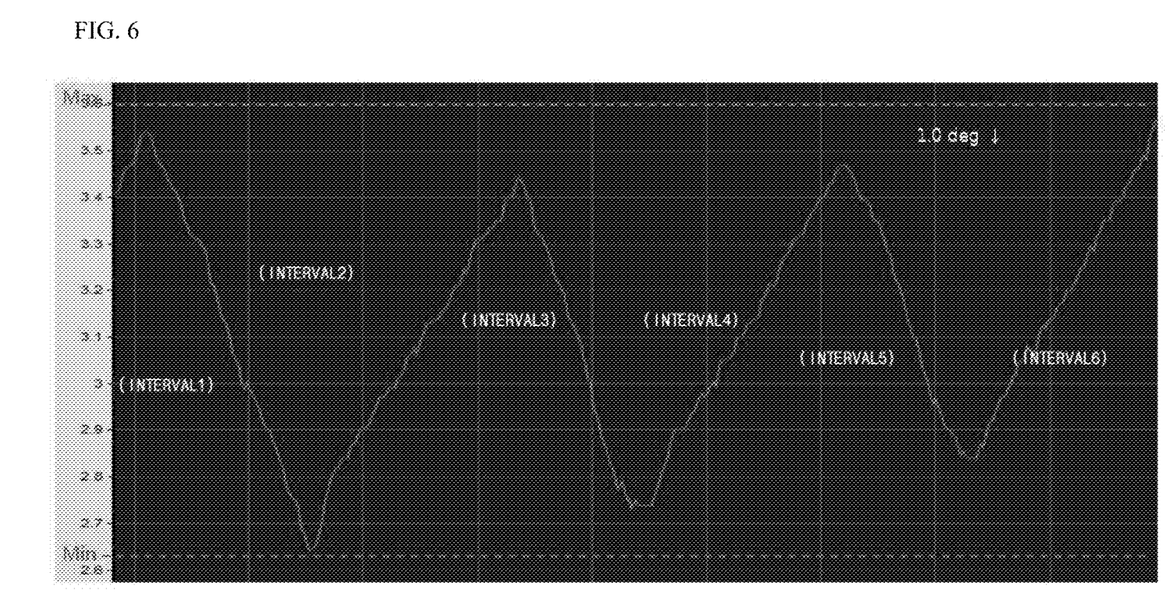
FIG. 6 is a graph showing an example temperature change in the refrigerating compartment by the process shown in FIG. 5.
Figure 7:
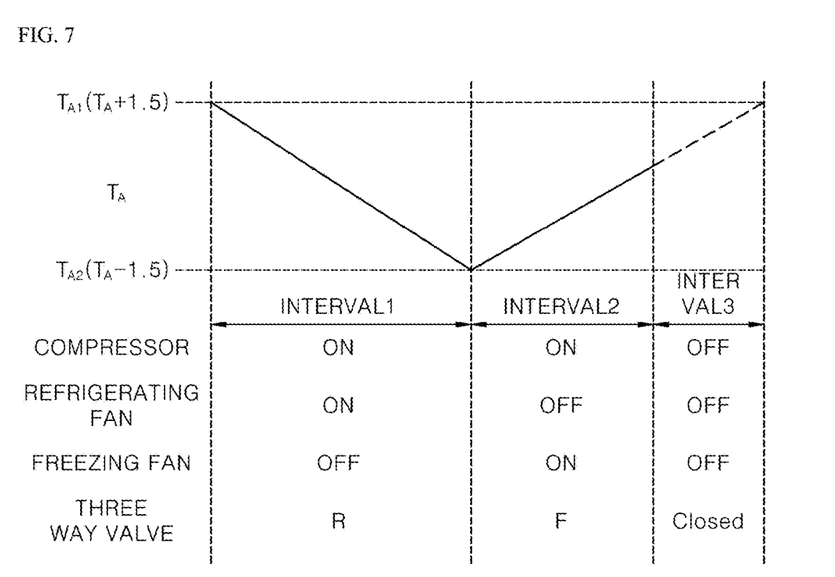
FIG. 7 is a view showing an example temperature control process according to the related art.
Figure 8:
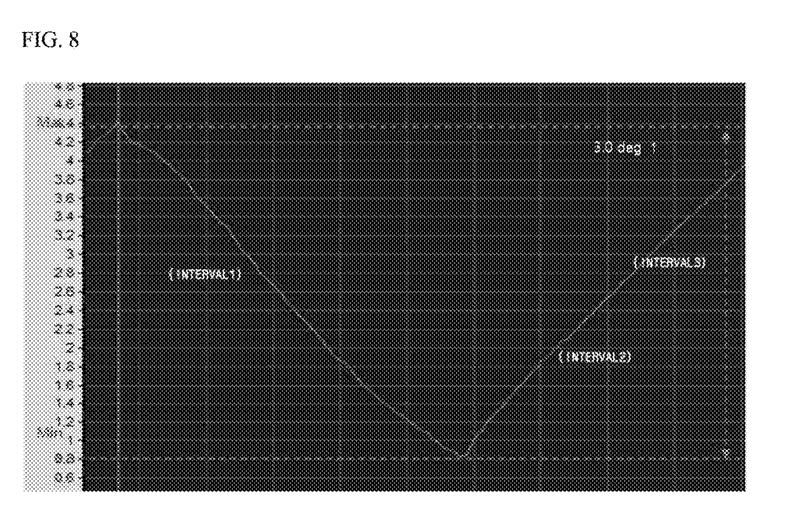
FIG. 8 is a graph showing an example temperature change in the refrigerating compartment by the temperature control process shown in FIG. 7.

FIG. 1 is a schematic block diagram showing an example refrigerator, FIG. 2 is a flowchart showing an example method for controlling a constant temperature of a refrigerating compartment of a refrigerator, FIG. 3 is a view showing an example of a constant temperature control process, FIG. 4 is a graph showing an example temperature change of a refrigerating compartment in the process of controlling the constant temperature shown in FIG. 3, FIG. 5 is a view showing another example of a constant temperature control process, FIG. 6 is a graph showing an example temperature change of a refrigerating compartment in the process of controlling the constant temperature shown in FIG. 5, FIG. 7 is a view showing an example temperature control process according to the related art, and FIG. 8 is a graph showing an example temperature change of a refrigerating compartment in the temperature control process shown in FIG. 7.

Referring to FIG. 1, an example refrigerator may include two evaporators 20 and 30 that are connected to one compressor 10, a main body, the compressor 10, the refrigerating compartment evaporator 20, the freezing compartment evaporator 30, a three-way valve 40, fans 50 and 55, a refrigerating compartment temperature measuring unit 60, a freezing compartment temperature measuring unit 70, and a controller 80.

The main body defines an external structure of the refrigerator and a storage space for storing stored goods in the main body.

The storage space may be separated by a partition and divided into a refrigerating compartment R and a freezing compartment F according to a set temperature.

For example, a bottom freezer type refrigerator may include the refrigerating compartment R provided at an upper portion of the main body and the freezing compartment F provided at a lower portion of the main body.

However, the present disclosure is not limited to this type of refrigerator. For example, the refrigerator may include various types of refrigerators such as a top mounting type of refrigerator in which the freezing compartment F is disposed in the upper portion of the refrigerating compartment R, a side by side type of refrigerator in which the freezing compartment F and the refrigerating compartment R are partitioned into left and right sides, and the like.

The main body is provided with a door that can open and close a front opening of the main body. The door may be configured such that a refrigerating compartment door and a freezing compartment door respectively open and close front portions of the refrigerating compartment R and the freezing compartment F, and may include a rotatable door rotatably connected to the main body, a drawer-type door slidably connected to the main body, and the like.

In some implementations, the compressor 10 may be disposed on a rear side of the main body in which the storage space is formed and may compress a refrigerant to a high-pressure and high-temperature state and a cooling compartment for generating cold air.

In some examples, the cooling compartment may be divided into a refrigerating compartment cooling compartment and a freezing compartment cooling compartment.

In some implementations, the refrigerating compartment cooling compartment may be separately provided on a side of the refrigerating compartment R and the freezing compartment cooling compartment may be separately provided on a side of the freezing compartment F. That is, each of the cooling compartments separately provided in this manner may separately supply cold air to its corresponding storage space.

The evaporators 20 and 30 for evaporating the refrigerant generated by the compressor 10 to generate cold air are respectively installed in the two cooling compartments.

The refrigerating compartment evaporator 20 may be installed in the refrigerating compartment cooling compartment and may generate cool air for cooling the refrigerating compartment R by receiving the refrigerant from the compressor 10.

The freezing compartment evaporator 30 may be installed in the freezing compartment cooling compartment and may generate cold air for cooling the freezing compartment F by receiving the refrigerant from the compressor 10.

Each of the refrigerating compartment evaporator 20 and the freezing compartment evaporator 30 may be connected to the compressor 10 and may receive the refrigerant transferred from the compressor 10.

Each of the refrigerating compartment evaporator 20 and the freezing compartment evaporator 30 may be connected to the compressor 10 by a refrigerant pipe. For example, a passage in which the refrigerating compartment evaporator 20 and the compressor 10 are connected by the refrigerant pipe is referred to as a first passage 25, and a passage in which the freezing compartment evaporator 30 and the compressor 10 are connected by the refrigerant pipe is referred to as a second passage 35.

The three-way valve 40 is provided between the compressor 10, the refrigerating compartment evaporator 20, and the freezing compartment evaporator 30.

In some implementations, the three-way valve 40 may perform an operation of selectively opening any one of the first passage 25 connecting the compressor 10 and the refrigerating compartment evaporator 20 and the second passage 35 connecting the compressor 10 and the freezing compartment evaporator 30.

In some examples, the fans 50 and 55 perform operations of supplying the cold air generated by the refrigerating compartment evaporator 20 to the refrigerating compartment R and supplying the cold air generated by the freezing compartment evaporator 30 to the freezing compartment F.

The fans 50 and 55 may include the refrigerating fan 50 installed in the refrigerating compartment cooling compartment and the freezing fan 55 installed in the freezing compartment cooling compartment.

The refrigerating fan 50 installed in the refrigerating compartment cooling compartment may perform an operation of supplying the cold air generated by the refrigerating compartment evaporator 20 to the refrigerating compartment R, and the freezing fan 55 installed in the freezing compartment cooling compartment may perform an operation of supplying the cold air generated by the freezing compartment evaporator 30 to the freezing compartment F.

For example, a structure in which the cold air generated in the cooling compartments is supplied to the refrigerating compartment R and the freezing compartment F will be described.

First, for an operation of supplying cold air to the refrigerating compartment R, that is, a refrigerating compartment cooling operation, the controller 80 may control operation of the three-way valve 40 so that the first passage 25 connecting the compressor 10 and the refrigerating compartment evaporator 20 is opened (hereinafter, referred to as "switching in R direction") while operating the compressor 10 to compress the refrigerant to a high-temperature and high-pressure state (hereinafter, referred to as "compressor ON").

The refrigerant compressed to the high-temperature and high-pressure state by the compressor 10 may be supplied to the refrigerating compartment evaporator 20. Next, in the refrigerating compartment evaporator 20, the refrigerant compressed by the compressor 10 is evaporated and heat-exchanged with ambient air, and air around the refrigerating compartment evaporator 20 exchanges heat with the refrigerant in this manner to become cold air.

While the cold air is generated in the refrigerating compartment cooling compartment in this manner, the controller 80 may control operation of the refrigerating fan 50 so that the refrigerating fan 50 is rotated.

By the operation of the refrigerating fan 50 operated in this manner, an air circulation flow in which the cold air generated in the refrigerating compartment cooling compartment is discharged into the refrigerating compartment R and the air in the refrigerating compartment R flows into the refrigerating compartment cooling compartment is generated.

For an operation of supplying cold air to the freezing compartment F, that is, a freezing compartment cooling operation, the controller 80 may control operation of the three-way valve 40 so that the second passage 35 connecting the compressor 10 and the freezing compartment evaporator 30 is opened while operating the compressor 10 to compress the refrigerant to the high-temperature and high-pressure state.

The refrigerant compressed to the high-temperature and high-pressure state by the compressor 10 may be supplied to the freezing compartment evaporator 30. Next, in the freezing compartment evaporator 30, the refrigerant compressed by the compressor 10 is evaporated and heat-exchanged with ambient air, and air around the freezing compartment evaporator 30 exchanges heat with the refrigerant in this manner to become cold air.

While the cold air is generated in the freezing compartment cooling compartment in this manner, the controller 80 may control operation of the freezing fan 55 so that the freezing fan 55 is rotated.

By the operation of the freezing fan 55 operated in this manner, an air circulation flow in which the cold air generated in the freezing compartment cooling compartment is discharged into the freezing compartment F and the air in the freezing compartment F flows into the freezing compartment cooling compartment is generated.

In some implementations, in the refrigerating compartment R and the freezing compartment F, the refrigerating compartment temperature measuring unit 60 for measuring a temperature of the refrigerating compartment R and the freezing compartment temperature measuring unit 70 for measuring a temperature of the freezing compartment F may be respectively provided.

The refrigerating compartment temperature measuring unit 60 may be installed in the refrigerating compartment R and include a temperature sensor for measuring the temperature of the refrigerating compartment R, and the freezing compartment temperature measuring unit 70 may be installed in the freezing compartment F and include a temperature sensor for measuring the temperature of the freezing compartment F.

The controller 80 may receive information about the temperature of the refrigerating compartment R measured by the refrigerating compartment temperature measuring unit 60 and information about the temperature of the freezing compartment F measured by the freezing compartment temperature measuring unit 70.

Next, the controller 80 may perform a control operation so that the temperature of each of the refrigerating compartment R and the freezing compartment F can be maintained to be corresponding set temperatures, using the information about the temperature of the refrigerating compartment R and the information about the temperature of the freezing compartment F transmitted thereto. For example, the controller 80 may perform the control operation so that the temperature of the refrigerating compartment R can be maintained to be a set refrigerating temperature designated by a value input by a user in a range of 0 to 5° C. or the temperature of the freezing compartment F can be maintained to be a set freezing temperature designated by a value input by a user in a range of −20 to −15° C.

Hereinafter, an example method for controlling a constant temperature of a refrigerating compartment of a refrigerator will be described with reference to FIGS. 1 to 6.

As shown in FIGS. 1 and 2, an example operation for cooling the refrigerating compartment R is performed in operation S10.

The refrigerating compartment cooling operation may be classified into a first refrigerating compartment cooling operation and a second refrigerating compartment cooling operation.

Hereinafter, an implementation of the first refrigerating compartment cooling operation and an implementation of the second refrigerating compartment cooling operation will be described.

Here, terms for describing the implementation of the first refrigerating compartment cooling operation and the implementation of the second refrigerating compartment cooling operation are defined as follows, and the implementation of the first refrigerating compartment cooling operation and the implementation of the second refrigerating compartment cooling operation will be described in detail below using the defined terms.

1. Compressor ON: a state in which the compressor 10 is operated to compress a refrigerant to the high-temperature and high-pressure state 2. Compressor OFF: a state in which operation of the compressor 10 is stopped 3. Switching in R direction: a switching state of the three-way valve 40 for opening the first passage 25 connecting the compressor 10 and the refrigerating compartment evaporator 20

4. Switching in F direction: a switching state of the three-way valve 40 for opening the second passage 35 connecting the compressor 10 and the freezing compartment evaporator 30

5. Refrigerating fan ON: a state in which the refrigerating fan 50 is operated so that the air circulation flow in which the cold air in the refrigerating compartment cooling compartment is discharged into the refrigerating compartment R and the air in the refrigerating compartment R flows into the refrigerating compartment cooling compartment is generated 6. Refrigerating fan OFF: a state in which operation of the refrigerating fan 50 is stopped 7. Freezing fan ON: a state in which the freezing fan 55 is operated so that the air circulation flow in which the cold air in the freezing compartment cooling compartment is discharged into the freezing compartment F and the air in the freezing compartment F flows into the freezing compartment cooling compartment is generated 8. Freezing fan OFF: a state in which operation of the freezing fan 55 is stopped Referring to FIGS. 1 and 3, the first refrigerating compartment cooling operation may be performed in such a manner that the compressor 10 and the refrigerating fan 50 are operated and the three-way valve 40 opens the first passage 25.

The first refrigerating compartment cooling operation may be performed by operation control of the controller 80 with respect to the compressor 10, the three-way valve 40, and the refrigerating fan 50 so that compressor ON, switching in R direction, and refrigerating fan ON are accomplished. At this time, the freezing fan 55 is kept in freezing fan OFF.

In this case, the refrigerant compressed to the high-temperature and high-pressure state by the compressor 10 may be supplied to the refrigerating compartment evaporator 20. Next, in the refrigerating compartment evaporator 20, the refrigerant compressed by the compressor 10 may be evaporated and heat-exchanged with ambient air, and the air around the refrigerating compartment evaporator 20 may exchange heat with the refrigerant in this manner to become cold air.

The cold air generated in the refrigerating compartment cooling compartment may be discharged into the refrigerating compartment R by operating the refrigerating fan 50, and the refrigerating compartment R may be cooled by the discharged cold air.

The second refrigerating compartment cooling operation may be performed such that only the refrigerating fan 50 is operated in the state in which operation of the compressor 10 is stopped, and the three-way valve 40 opens the first passage 25.

The second refrigerating compartment cooling operation may be performed by operation control of the controller 80 with respect to the compressor 10, the three-way valve 40, and the refrigerating fan 50 so that compressor OFF, switching in R direction, and refrigerating fan ON are accomplished, and even at this time, the freezing fan 55 is kept in freezing fan OFF.

The second refrigerating compartment cooling operation may be performed after the freezing compartment F is cooled, that is, after the freezing compartment cooling operation is completed.

In a process in which the freezing compartment cooling operation is performed, refrigerant evaporated by the freezing compartment evaporator 30 is transferred to the compressor 10 in a low-temperature gas state.

In this state, when the second refrigerating compartment cooling operation is started, operation of the compressor 10 is stopped so that the refrigerant transferred to the compressor 10 in the low-temperature gas state is transferred as it is to the side of the refrigerating compartment evaporator 20 without being compressed by the compressor 10.

Since refrigerant transferred to the side of the refrigerating compartment evaporator 20 has a lower temperature than that of the refrigerating compartment cooling compartment, refrigerant passing through the refrigerating compartment evaporator 20 and the ambient air are subjected to heat exchange in the refrigerating compartment evaporator 20.

Next, the cold air generated in this manner is discharged into the refrigerating compartment R by operating the refrigerating fan 50, and the refrigerating compartment R is cooled by the discharged cold air.

In some implementations, the heat exchange at this time may be performed at a lower level than that of the heat exchange occurring in the first refrigerating compartment cooling operation, and thus a temperature of the cold air generated by the heat exchange in the second refrigerating compartment cooling operation is higher than a temperature of the cold air generated in the first refrigerating compartment cooling operation while being considerably cooler than a typical refrigerating compartment temperature $T_R$, and therefore the cooling for the refrigerating compartment R can be performed at a certain level even with the cold air generated at this time.

In the second refrigerating compartment cooling operation performed as described above, the compressor is not operated due to compressor OFF, and therefore, when the second refrigerating compartment cooling operation is performed, energy consumption caused by operation of the compressor may be reduced to reduce power consumption of the refrigerator.

In some implementations, the refrigerating compartment R and the freezing compartment F may be cooled in such a manner that cooling the refrigerating compartment R and cooling the freezing compartment F are alternately performed. For example, one cooling cycle is performed including at least one alternation of the refrigerating compartment cooling operation and the freezing compartment cooling operation.

In some examples, during the one cooling cycle, the refrigerating compartment cooling operation, the freezing compartment cooling operation, and the refrigerating compartment cooling operation are alternated in series at least once. When a set condition is satisfied after the refrigerating compartment cooling operation and the freezing compartment cooling operation have been alternated at least once, the entire cooling process according to one cooling cycle may be terminated.

In some implementations, at an initial time point of the cooling cycle, the refrigerating compartment cooling operation is performed.

During a period (hereinafter, referred to as "cooling pause period") in which the cooling process described above is terminated so that cooling for both the refrigerating compartment R and the freezing compartment F is not performed, the temperatures of the refrigerating compartment R and the freezing compartment F may gradually increase.

In this case, due to a characteristic in that the refrigerating compartment R is maintained at a relatively higher temperature than the freezing compartment F, the temperature of the refrigerating compartment R may tend to rise at a higher speed than the temperature of the freezing compartment F during the cooling pause period.

In some examples, the freezing compartment F may be maintained at a very low temperature, and thus a temperature rise of only about 4 to 5° C. may not significantly affect stored goods stored in the freezing compartment F, but a temperature rise of about 4 to 5° C. in the refrigerating compartment R may cause a deleterious effect on freshness of stored goods stored in the refrigerating compartment R.

In some implementations, the refrigerating compartment cooling operation may be performed first at the start of one cooling cycle so that freshness maintenance of the refrigerating compartment R is performed with the highest priority.

Therefore, the refrigerating compartment cooling operation, for example, the first refrigerating compartment cooling operation, may be performed at the initial time point of the cooling cycle.

The refrigerating compartment temperature $T_R$ may be measured by the refrigerating compartment temperature measuring unit 60 in the refrigerating compartment R while the refrigerating compartment R is being cooled by the first refrigerating compartment cooling operation.

The refrigerating compartment temperature $T_R$ measured by the refrigerating compartment temperature measuring unit 60 may be transmitted to the controller 80 in real time, and the controller 80 may determine a time point at which the first refrigerating compartment cooling operation is completed on the basis of information about the refrigerating compartment temperature $T_R$ transmitted thereto.

Control of a constant temperature of a refrigerating compartment of a refrigerator may be performed so that the refrigerating compartment temperature $T_R$ is maintained within a predetermined set temperature range including a set refrigerating temperature $T_A$.

For example, when the set refrigerating temperature $T_A$ is 3.5° C., the control of a constant temperature of a refrigerating compartment of a refrigerator is performed so that the refrigerating compartment temperature $T_R$ is maintained within a range of 3 to 4° C.

Here, the set refrigerating temperature $T_A$ may be a temperature designated by a value input by a user. At this time, the predetermined set temperature range is the range of 3 to 4° C., a set maximum temperature $T_{A1}$ in the set temperature range is 4° C., a set minimum temperature $T_{A2}$ is 3° C., and a temperature variation range within the set temperature range is 1° C.

In a process in which the temperature of the refrigerating compartment R, which is cooled by the first refrigerating compartment cooling operation, is monitored in real time by the controller 80, when the temperature of the refrigerating compartment R is lowered to the set minimum temperature $T_{A2}$ (e.g., less than or equal to $T_{A2}$), the first refrigerating compartment cooling operation may be stopped and the freezing compartment cooling operation is performed in operation S20.

The freezing compartment cooling operation may be performed in such a manner that the compressor 10 and the freezing fan 55 are operated and the three-way valve 40 opens the second passage 35.

The freezing compartment cooling operation may be performed by operation control of the controller 80 with respect to the compressor 10, the three-way valve 40, and the freezing fan 55 so that compressor ON, switching in F direction, and freezing fan ON are accomplished. At this time, the refrigerating fan 50 is in refrigerating fan OFF.

In this case, the refrigerant compressed to the high-temperature and high-pressure state by the compressor 10 may be supplied to the freezing compartment evaporator 30.

Next, in the freezing compartment evaporator 30, the refrigerant compressed by the compressor 10 may be evaporated and heat-exchanged with ambient air, and air around the freezing compartment evaporator 30 may exchange heat with the refrigerant in this manner to become cold air.

The cold air generated in the freezing compartment cooling compartment may be discharged into the freezing compartment F by operating the freezing fan 55, and the freezing compartment F is cooled by the discharged cold air.

In some implementations, when the above-described freezing compartment cooling operation is completed, the refrigerating compartment cooling operation may be performed again. In this manner, the refrigerating compartment cooling operation and the freezing compartment cooling operation may be alternately performed.

In some example, a time point at which the refrigerating compartment cooling operation and the freezing compartment cooling operation are alternated is dependent on the temperature of the refrigerating compartment R.

For example, when a condition for allowing the refrigerating compartment cooling operation to be performed while the freezing compartment F is being cooled by the freezing compartment cooling operation is satisfied, the refrigerating compartment cooling operation and the freezing compartment cooling operation may be alternately performed in such a manner that the freezing compartment cooling operation is stopped and the refrigerating compartment cooling operation is resumed even when the freezing compartment is not cooled to a target temperature.

In some implementations, when the temperature of the refrigerating compartment R rises to the set maximum temperature $T_{A1}$ (e.g., greater than or equal to $T_{A1}$) while the freezing compartment F is being cooled by the freezing compartment cooling operation, the freezing compartment cooling operation may be stopped and the first refrigerating compartment cooling operation may be resumed in operation S10.

Next, when the temperature of the refrigerating compartment R is lowered to the set minimum temperature $T_{A2}$ by the resumed freezing compartment cooling operation, the first refrigerating compartment cooling operation is stopped and the freezing compartment cooling operation is resumed, and this operation is repeatedly performed.

By alternating the refrigerating compartment cooling operation and the freezing compartment cooling operation depending on the temperature of the refrigerating compartment R as described above, the temperature of the refrigerating compartment R is always kept within the set temperature range.

In some implementations, since cooling for the refrigerating compartment R is performed until the temperature of the refrigerating compartment R is lowered to the set minimum temperature $T_{A2}$ regardless of the temperature of the freezing compartment F, a temperature variation range of the refrigerating compartment R may be significantly reduced in comparison to the case in which the refrigerating compartment R is cooled with a condition that the temperature of the freezing compartment F is satisfied.

In one cooling cycle in which the refrigerating compartment cooling operation, the freezing compartment cooling operation, and the refrigerating compartment cooling operation are alternated in series as described above, the refrigerating compartment cooling operation is performed at a last time point of the cooling cycle.

This is because a rise of the refrigerating compartment temperature $T_R$ in the cooling pause period after one cooling cycle ends may exceed an appropriate level.

While the freezing compartment cooling operation is being performed, the cooling for the refrigerating compartment R is stopped and the temperature of the refrigerating compartment R may rise. Assuming that the freezing compartment cooling operation is performed at the last time point of the cooling cycle, the temperature of the refrigerating compartment R may rise to some extent when one cooling cycle is completed.

When the cooling pause period proceeds in a state in which the temperature of the refrigerating compartment R rises in this manner, there may be a risk of the rise of the refrigerating compartment temperature $T_R$ exceeding the appropriate level during the cooling pause period.

Therefore, when the refrigerating compartment cooling operation is performed at the last time point of one cooling cycle, a temperature state of the refrigerating compartment R may be maintained so that the temperature of the refrigerating compartment R does not rise above the appropriate level even during the cooling pause period.

The refrigerating compartment cooling operation performed at the last time point of one cooling cycle may be performed in the form of the first refrigerating compartment cooling operation or the second refrigerating compartment cooling operation according to an outside temperature (e.g., a room temperature) around the refrigerating compartment R.

For example, when an outside temperature RT around the refrigerating compartment exceeds a preset reference temperature $T_0$, the refrigerating compartment cooling operation performed at the last time point of one cooling cycle may be performed in the form of the first refrigerating compartment cooling operation in operation S30 (see FIGS. 3 and 4).

In some examples, when the outside temperature RT around the refrigerating compartment is lower than or equal to the preset reference temperature $T_0$, the refrigerating compartment cooling operation performed at the last time point of one cooling cycle is performed in the form of the second refrigerating compartment cooling operation (see FIGS. 5 and 6).

Here, the outside temperature RT around the refrigerating compartment is defined as a temperature of an indoor space in which the refrigerator is installed, for instance. The reference temperature $T_0$ is set as the reference temperature to distinguish whether the temperature of the indoor space in which the refrigerator is installed is a low temperature environment or a high temperature environment.

For example, the reference temperature $T_0$ may be set as 10 to 15° C., and more particularly as 12.5° C., for instance.

However, the present disclosure is not limited thereto, and a temperature appropriately selected in consideration of an overall size of the refrigerator, a volume of the refrigerating compartment R, and cooling performance of the refrigerator may be set as the reference temperature $T_0$.

The fact that the outside temperature RT around the refrigerating compartment corresponds to a condition in which the outside temperature RT exceeds the reference temperature $T_0$ may mean that a refrigerator may be installed in a high temperature environment, and the temperature of the refrigerating compartment R may rise at a relatively high speed.

The fact that the outside temperature RT around the refrigerating compartment corresponds to a condition in which the outside temperature RT is lower than or equal to the reference temperature $T_0$ may mean that the refrigerator is installed in the low temperature environment, and the temperature of the refrigerating compartment R may rise at a relatively low speed.

In some implementations, when the outside temperature RT around the refrigerating compartment exceeds the reference temperature $T_0$, the first refrigerating compartment cooling operation may be performed at the last time point of one cooling cycle, and thus the refrigerating compartment R may be sufficiently cooled so that the temperature of the refrigerating compartment R is lowered to the set minimum temperature within the set temperature range (see FIGS. 3 and 4).

The temperature state of the refrigerating compartment R can be effectively maintained so that the temperature of the refrigerating compartment R may not rise above the appropriate level even when one cooling cycle is completed and the cooling pause period occurs.

In some implementations, when the outside temperature RT around the refrigerating compartment is lower than or equal to the reference temperature $T_0$, the second refrigerating compartment cooling operation may be performed at the last time point of one cooling cycle in operation S40 (see FIGS. 5 and 6).

When the second refrigerating compartment cooling operation is performed at the last time point of the cooling cycle in this manner, a cooling level for the refrigerating compartment R which is achieved by the second refrigerating compartment cooling operation is relatively lower than a cooling level for the refrigerating compartment R which is achieved by the first refrigerating compartment cooling operation, and therefore the cooling for the refrigerating compartment R may be performed to a lesser degree than in the case in which the first refrigerating compartment cooling operation is performed.

For example, in a case in which the first refrigerating compartment cooling operation is performed with a condition that the set refrigerating temperature $T_A$ is 3.5° C. and the set temperature variation range is 1° C., when the first refrigerating compartment cooling operation is completed, the refrigerating compartment R is cooled to a level at which the temperature of the refrigerating compartment R is lowered to 3.3° C., which is close to the set minimum temperature of 3° C. Here, when the second refrigerating compartment cooling operation is performed, the refrigerating compartment R may be cooled to a level at which the temperature of the refrigerating compartment R is lowered to a temperature slightly higher than 3.3° C.

However, in consideration of the fact that the condition in which the second refrigerating compartment cooling operation is performed as described above is a condition of the refrigerator being installed in the low temperature environment, even when the cooling for the refrigerating compartment R is performed to a lesser degree than in the case in which the first refrigerating compartment cooling operation is performed, the temperature state of the refrigerating compartment R can be sufficiently effectively maintained so that the temperature of the refrigerating compartment R may not rise above the appropriate level during the cooling pause period.

For example, when the outside temperature RT around the refrigerating compartment is lower than or equal to the reference temperature $T_0$, that is, when the refrigerator is installed in the low temperature environment, it may be possible to reduce energy consumption caused by operation of the compressor while sufficiently effectively maintaining the temperature state of the refrigerating compartment R, thereby reducing the power consumption of the refrigerator.

There are various methods for measuring the outside temperature RT around the refrigerating compartment.

One of the methods uses information about a rising speed of the refrigerating compartment temperature $T_R$ that is monitored while the freezing compartment cooling operation is being performed during the cooling cycle.

According to this, by determining the change in the refrigerating compartment temperature $T_R$ transmitted in real time, it may be possible to acquire information about how fast the refrigerating compartment temperature $T_R$ rises during a period in which the refrigerating compartment R is not cooled.

In some examples, the temperature rising speed of the refrigerating compartment R will increase due to an increase in the outside temperature RT around the refrigerating compartment so that the external temperature RT around the refrigerating compartment can be indirectly measured on the basis of the information about the temperature rising speed of the refrigerating compartment R acquired in this manner.

As such, it may be possible to determine whether the outside temperature RT around the refrigerating compartment is lower than or equal to the reference temperature $T_0$ by comparing the outside temperature RT around the refrigerating compartment measured in this manner with the reference temperature $T_0$.

As another example, a temperature sensor may be installed outside the refrigerator, and the outside temperature RT around the refrigerating compartment may be measured using the temperature sensor installed in this manner.

As another example, a selection of the refrigerating compartment cooling operation performed at the last time point of the cooling cycle may be performed in such a manner that a user may select either a low temperature environment mode or a high temperature environment mode through an operation panel provided at an outer side of the refrigerator.

The termination of one cooling cycle described above may be achieved together with the termination of the refrigerating compartment cooling operation performed at the last time point of the cooling cycle after a freezing compartment temperature $T_F$ reaches a set freezing temperature $T_B$.

For example, in order to achieve a freshness maintenance purpose of the refrigerating compartment R as a top priority, the temperature control for the refrigerating compartment R is unconditionally performed so that the cooling for the refrigerating compartment R is performed until the temperature of the refrigerating compartment R is lowered to the set minimum temperature $T_{A2}$ regardless of the temperature of the freezing compartment F, and therefore there occurs a case in which the freezing compartment cooling operation is terminated and the cooling for the refrigerating compartment R is resumed in a state in which the temperature of the freezing compartment F has not reached the set freezing temperature, that is, a state in which the temperature of the freezing compartment F is not satisfied.

For example, when the temperature of the refrigerating compartment R rapidly rises due to a state in which the refrigerating compartment R is frequently opened or a state in which stored goods are stored in the refrigerating compartment R, the number of times that the freezing compartment cooling operation is repeatedly terminated and the cooling for the refrigerating compartment R is resumed in the state in which the temperature of the freezing compartment F is not satisfied as described above may be increased.

When the cooling for the freezing compartment F is repeatedly terminated and the cooling pause period proceeds in the state in which the temperature of the freezing compartment F is not satisfied while several cooling cycles are repeated, a deviation between the set freezing temperature and an actual temperature of the freezing compartment F increases, which makes it difficult to achieve the original purpose of keeping stored goods stored in the freezing compartment in a desired state.

In some implementations, only when the refrigerating compartment cooling operation is completed at the last time point of the cooling cycle with a condition that the freezing compartment temperature $T_F$ reaches the set freezing temperature, that is, that the freezing compartment temperature $T_F$ is satisfied, the cooling operation according to one cooling cycle may be terminated and the cooling pause period may proceed.

Thus, temperature states of both the refrigerating compartment R and the freezing compartment F may be effectively maintained so that the temperature of the refrigerating compartment R and the temperature of the freezing compartment F do not rise above the appropriate level even while one cooling cycle is completed and the cooling pause period proceeds.

As a result of performing the control of a constant temperature of a refrigerating compartment of a refrigerator as described above, the temperature of the refrigerating compartment R may be maintained at a level at which the temperature variation range is remarkably small, for example, at a constant temperature at which the temperature variation range is less than 1° C. (see FIGS. 4 and 6).

In the case of a method for controlling a temperature of a refrigerator according to a related art, a cooling operation is performed by repeating a pattern in which cooling for a refrigerating compartment is performed to lower a temperature of the refrigerating compartment to a predetermined temperature, cooling for a freezing compartment is performed to lower a temperature of the freezing compartment to a predetermined temperature, and then cooling for the refrigerating compartment is performed again, and therefore a temperature variation range is large (about 3° C. or more), which may cause a large deviation between a set temperature of the refrigerating compartment and an actual temperature thereof. As a result, it may be difficult to effectively maintain freshness of stored goods stored in the refrigerating compartment (see FIGS. 7 and 8).

In contrast, when the cooling for the refrigerating compartment R and the cooling for the freezing compartment F are performed according to the method for controlling a constant temperature of a refrigerating compartment of a refrigerator according to the present implementation, the temperature of the refrigerating compartment R may be maintained at a constant temperature at which the temperature variation range is remarkably small, that is, the deviation between the set refrigerating temperature $T_A$ and the actual temperature thereof is ±0.5° C. or less, and thus freshness maintenance performance of the refrigerator for maintaining freshness of stored goods stored in the refrigerating compartment R may be effectively improved.

As described above, cooling the refrigerating compartment R and cooling the freezing compartment F may be performed in an environment in which freshness maintenance of the refrigerating compartment R is achieved as a top priority, and thus a constant temperature of the refrigerating compartment R may be effectively maintained so that freshness maintenance performance of the refrigerator is effectively improved.

In some implementations, the refrigerating compartment cooling operation may be performed differently according to an environment in which the refrigerator is installed, and thus power consumption of the refrigerator may be effectively reduced while maintaining the temperature state of the refrigerating compartment R at the constant temperature.

In some implementations, the cooling operation may be controlled so that the cooling operation according to one cooling cycle is terminated only when the refrigerating compartment cooling operation is completed at the last time point of the cooling cycle with the condition that the freezing compartment temperature $T_F$ is satisfied, and thus the temperature state of both the refrigerating compartment R and the freezing compartment F may be effectively maintained even while the cooling pause period proceeds.

It should be apparent to those skilled in the art that various modifications can be made to the above-described exemplary implementations of the present disclosure without departing from the spirit or scope of the disclosure. Thus, it is intended that the present disclosure covers all such modifications provided they come within the scope of the appended claims and their equivalents.

What is claimed is:

1. A method for controlling a temperature of a refrigerating compartment of a refrigerator, the refrigerator comprising a compressor configured to supply a compressed refrigerant, a refrigerating compartment evaporator configured to receive the refrigerant from the compressor and to generate first cold air for cooling the refrigerating compartment, a freezing compartment evaporator configured to receive the refrigerant from the compressor and to generate second cold air for cooling a freezing compartment, and a three-way valve configured to selectively open and close one of a first passage connecting the compressor and the refrigerating compartment evaporator and a second passage connecting the compressor and the freezing compartment evaporator, the method comprising:

cooling the refrigerating compartment;
cooling the freezing compartment;
determining the temperature of the refrigerating compartment;
based on the temperature of the refrigerating compartment, controlling the refrigerating compartment to a constant temperature range by controlling opening and closing of the first and second passages of the three-way valve to alternate cooling the refrigerating compartment and cooling the freezing compartment;

comparing the temperature of the refrigerating compartment to a set minimum temperature;
based on the comparison of the temperature of the refrigerating compartment to the set minimum temperature, determining whether the temperature of the refrigerating compartment is less than or equal to the set minimum temperature;
based on a determination that the temperature of the refrigerating compartment is less than or equal to the set minimum temperature, cooling the freezing compartment;
comparing the temperature of the refrigerating compartment to a set maximum temperature;
based on the comparison of the temperature of the refrigerating compartment to the set maximum temperature, determining whether the temperature of the refrigerating compartment is greater than or equal to the set maximum temperature; and
based on a determination that the temperature of the refrigerating compartment is greater than or equal to the set maximum temperature, cooling the refrigerating compartment.

2. The method of claim 1, further comprising:
based on cooling the freezing compartment, determining a temperature of the freezing compartment;
comparing the temperature of the freezing compartment to a preset freezing temperature; and
based on the comparison of the temperature of the freezing compartment to the preset freezing temperature, determining whether the temperature of the freezing compartment is greater than the preset freezing temperature,
wherein comparing the temperature of the refrigerating compartment to the set maximum temperature comprises: based on a determination that the temperature of the freezing compartment is greater than the preset freezing temperature, comparing the temperature of the refrigerating compartment to the set maximum temperature.

3. The method of claim 1, wherein at least one alternation of cooling the refrigerating compartment and cooling the freezing compartment defines a cooling cycle between an initial time point and a last time point.

4. The method of claim 3, wherein cooling the refrigerating compartment includes cooling the refrigerating compartment at the last time point of the cooling cycle.

5. The method of claim 4, wherein cooling the refrigerating compartment includes cooling the refrigerating compartment at the initial time point of the cooling cycle.

6. The method of claim 1, wherein cooling the refrigerating compartment includes:
activating the compressor;
operating a refrigerating fan configured to supply the first cold air to the refrigerating compartment; and
opening the first passage of the three-way valve.

7. The method of claim 1, wherein cooling the refrigerating compartment includes:
deactivating the compressor;
operating a refrigerating fan configured to supply the first cold air to the refrigerating compartment; and
opening the first passage of the three-way valve.

8. The method of claim 3, further comprising performing at least one of a first refrigerating operation or a second refrigerating operation,
wherein performing the first refrigerating operation includes:
activating the compressor, operating a refrigerating fan configured to supply the first cold air to the refrigerating compartment, and opening the first passage of the three-way valve, and wherein performing the second refrigerating operation includes:
deactivating the compressor,
operating the refrigerating fan, and
opening the first passage of the three-way valve.

9. The method of claim 8, wherein cooling the freezing compartment includes:
activating the compressor;
operating a freezing fan configured to supply the second cold air to the freezing compartment; and
opening the second passage of the three-way valve.

10. The method of claim 9, wherein cooling the freezing compartment further includes operating the freezing fan without operating the refrigerating fan.

11. The method of claim 9, wherein cooling the refrigerating compartment further includes operating the refrigerating fan without operating the freezing fan.

12. The method of claim 8, wherein performing the second refrigerating operation includes performing the second refrigerating operation at the last time point of the cooling cycle.

13. The method of claim 8, further comprising:
determining an outside temperature around the refrigerating compartment;
comparing the outside temperature to a preset reference temperature;
determining whether the outside temperature is less than or equal to the preset reference temperature; and
based on a determination that the outside temperature is less than or equal to the preset reference temperature, performing the second refrigerating operation.

14. The method of claim 13, further comprising, based on a determination that the outside temperature is greater than the preset reference temperature, performing the first refrigerating operation.

15. The method of claim 13, wherein determining the outside temperature includes determining the outside temperature based on information about a temperature rising speed of the refrigerating compartment.

16. The method of claim 1, further comprising:
determining a temperature of the freezing compartment;
comparing the temperature of the freezing compartment to a preset freezing temperature;
determining whether the temperature of the freezing compartment is less than the preset freezing temperature;
based on a determination that the temperature of the freezing compartment is less than the preset freezing temperature, terminating cooling the freezing compartment; and
based on termination of cooling the freezing compartment, terminating cooling the refrigerating compartment.

17. The method of claim 16, further comprising:
based on termination of cooling the freezing compartment, comparing an outside temperature around the refrigerating compartment to a preset reference temperature;
determining whether the outside temperature is greater than the preset reference temperature; and
based on a determination that the outside temperature is greater than the preset reference temperature, performing a first refrigerating operation,
wherein performing the first refrigerating operation includes activating the compressor, operating a refrigerating fan configured to supply the first cold air to the refrigerating compartment, and opening the first passage of the three-way valve.

18. The method of claim 17, further comprising:
determining whether the outside temperature is less than or equal to the preset reference temperature; and
based on a determination that the outside temperature is less than or equal to the preset reference temperature, performing a second refrigerating operation,
wherein performing the second refrigerating operation includes deactivating the compressor, operating the refrigerating fan, and opening the first passage of the three-way valve.

19. The method of claim 1, wherein the set maximum temperature and the set minimum temperature bound a predetermined set temperature range.

20. A refrigerator comprising:
a main body defining a refrigerating compartment and a freezing compartment;
a compressor provided at the main body and configured to compress refrigerant and supply the compressed refrigerant;
a refrigerating compartment evaporator configured to receive the compressed refrigerant and to generate first cold air for cooling the refrigerating compartment;
a freezing compartment evaporator configured to receive the compressed refrigerant and to generate second cold air for cooling the freezing compartment;
a three-way valve configured to selectively open and close one of a first passage connecting the compressor and the refrigerating compartment evaporator and a second passage connecting the compressor and the freezing compartment evaporator;
a refrigerating fan configured to supply the first cold air to the refrigerating compartment;
a refrigerating compartment temperature measuring sensor configured to measure a temperature of the refrigerating compartment; and
a controller configured to control the compressor, the three-way vale, and the refrigerating fan to alternate cooling of the refrigerating compartment and cooling of the freezing compartment,
wherein the controller is configured to control the refrigerating compartment to a constant temperature range by controlling opening and closing of the first and second passages of the three-way valve to alternate cooling of the refrigerating compartment and cooling of the freezing compartment based on the temperature of the refrigerating compartment measured by the refrigerating compartment temperature measuring sensor,
wherein the controller is further configured to:
compare the temperature of the refrigerating compartment to a set minimum temperature,
based on the comparison of the temperature of the refrigerating compartment to the set minimum temperature, determine whether the temperature of the refrigerating compartment is less than or equal to the set minimum temperature,
cool the freezing compartment based on a determination that the temperature of the refrigerating compartment is less than or equal to the set minimum temperature,
compare the temperature of the refrigerating compartment to a set maximum temperature,
based on the comparison of the temperature of the refrigerating compartment to the set maximum temperature, determine whether the temperature of the refrigerating compartment is greater than or equal to the set maximum temperature, and cool the refrigerating compartment based on a determination that the temperature of the refrigerating compartment is greater than or equal to the set maximum temperature.

\* \* \* \* \*